United States Patent
Kang

(10) Patent No.: US 7,990,399 B2
(45) Date of Patent: Aug. 2, 2011

(54) MOBILE COMMUNICATION TERMINAL HAVING WIDE DISPLAY UNIT AND METHOD OF CONTROLLING WIDE DISPLAY UNIT

(75) Inventor: Byung Jin Kang, Uijeongbu-si (KR)

(73) Assignee: Samsung Electronics Co., Ltd (KR)

( * ) Notice: Subject to any disclaimer, the term of this patent is extended or adjusted under 35 U.S.C. 154(b) by 1041 days.

(21) Appl. No.: 11/782,308

(22) Filed: Jul. 24, 2007

(65) Prior Publication Data

US 2008/0051153 A1 Feb. 28, 2008

(30) Foreign Application Priority Data

Jul. 24, 2006 (KR) .................. 10-2006-0068941
May 2, 2007 (KR) .................. 10-2007-0042604

(51) Int. Cl.
*G09G 5/00* (2006.01)
(52) U.S. Cl. ........................ 345/649; 345/204
(58) Field of Classification Search .......... 345/169, 345/204, 649; 340/815.86; 382/296; 455/566
See application file for complete search history.

(56) References Cited

U.S. PATENT DOCUMENTS 5,949,408 A 9/1999 Kang et al.
7,372,452 B2 * 5/2008 Park ....................... 345/158

FOREIGN PATENT DOCUMENTS

| KR | 1020040005291 | 1/2004 |
| KR | 1020050017772 | 2/2005 |
| KR | 1020050024021 | 3/2005 |
| KR | 1020050076937 | 7/2005 |
| KR | 1020060045849 | 5/2006 |
| KR | 1020060056679 | 5/2006 |

* cited by examiner

*Primary Examiner* — Amare Mengistu
*Assistant Examiner* — Abbas Abdulselam
(74) *Attorney, Agent, or Firm* — The Farrell Law Firm, P.C.

(57) ABSTRACT

A mobile communication terminal having a wide display unit and a method of controlling a wide display unit are provided. The method of controlling a wide display unit having a standard area and an extension area in a mobile communication terminal includes displaying data in the standard area and user's additional information in the extension area; and repartitioning, if a rotation of the wide display unit is detected, the standard area and the extension area, and rotating and displaying the data and user's additional information in a direction opposite to the rotation direction of the wide display unit. Therefore, by displaying data in a standard area of the wide display unit and displaying user's additional information in an extension area of the wide display unit, the wide display unit can be effectively used.

20 Claims, 5 Drawing Sheets

MOBILE COMMUNICATION TERMINAL HAVING WIDE DISPLAY UNIT AND METHOD OF CONTROLLING WIDE DISPLAY UNIT

PRIORITY

This application claims priority under 35 U.S.C. §119 to applications filed in the Korean Intellectual Property Office on May 2, 2007, and assigned Serial No. 2007-0042604, and on Jul. 24, 2006 and assigned Serial No. 2006-0068941, the contents of which are incorporated herein by reference.

BACKGROUND OF THE INVENTION

1. Field of the Invention

The present invention relates to a mobile communication terminal having a wide display unit and a method of controlling a wide display unit.

2. Description of the Related Art

Nowadays, as the technology of mobile communication terminals has been rapidly developed new, technologies for checking an image such as a picture and receiving Digital Multimedia Broadcasting (DMB) using the mobile communication terminals have been also developed.

Accordingly, a display unit for the mobile communication terminal has been developed in a wide form so as to give greater satisfaction to a user in providing multimedia data such as images or digital multimedia broadcasting.

However, the wide form of display unit is generally unsatisfactorily used except when viewing the multimedia data and does not provide an effective interface to the user.

SUMMARY OF THE INVENTION

The present invention has been made to solve the above problems, and the present invention provides a mobile communication terminal having a wide display unit and a method of controlling a wide display unit that can effectively use the wide display unit by displaying data in a standard area of the wide display unit and user's additional information in an extension area of the wide display unit.

The present invention further provides a mobile communication terminal having a wide display unit and a method of controlling a wide display unit that can provide an interface that is convenient for a user by displaying the user's additional information in the extension area of the wide display unit.

In accordance with an aspect of the present invention, a method of controlling a wide display unit having a standard area and an extension area in a mobile communication terminal includes displaying data in the standard area and user's additional information in the extension area; and repartitioning, when a rotation of the wide display unit is detected, the standard area and the extension area, and rotating and displaying the data and user's additional information in a direction opposite to a rotation direction of the wide display unit.

In accordance with another aspect of the present invention, a mobile communication terminal includes a wide display unit having a standard area for displaying data and an extension area for displaying user's additional information; a sensor unit for detecting a rotation of the wide display unit; and a controller for controlling the wide display unit to rotate the data displayed in the standard area and the user's additional information displayed in the extension area according to a rotation result of the wide display unit detected by the sensor unit.

BRIEF DESCRIPTION OF THE DRAWINGS

The aspects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A mobile communication terminal according to the present invention has a wide display unit, including a telecommunication appliance or multimedia appliance having a display unit, such as a mobile terminal, mobile phone, Personal Digital Assistant (PDA), smart phone, and applications thereof.

Figure 1:
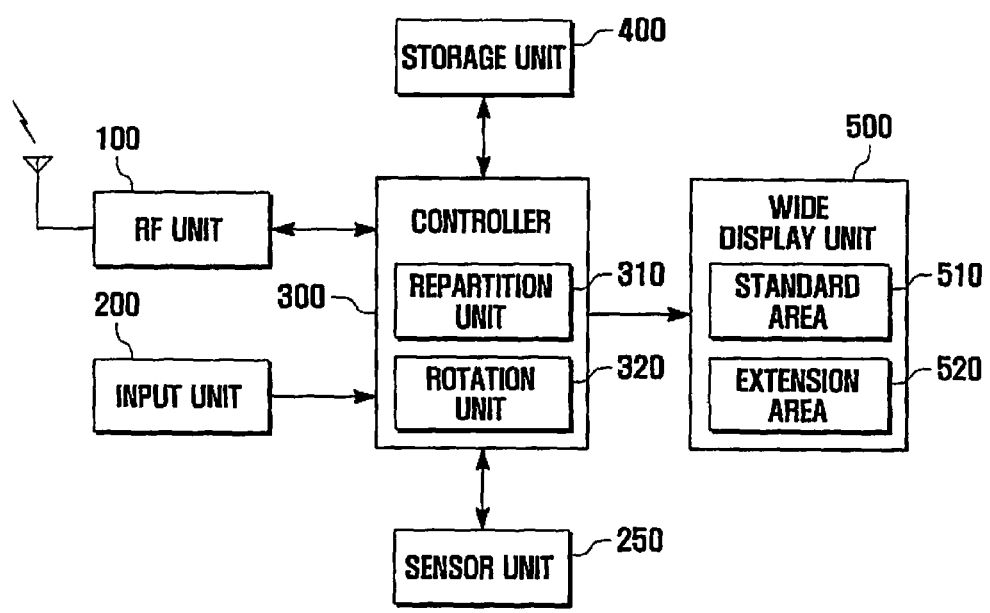
FIG. 1 is a block diagram illustrating a configuration of a mobile communication terminal having a wide display unit according to an exemplary embodiment of the present invention.

Referring to FIG. 1, the mobile communication terminal includes a radio frequency (RF) unit 100, input unit 200, sensor unit 250, controller 300, repartition unit 310, rotation unit 320, storage unit 400, wide display unit 500, standard area 510, and extension area 520.

The RF unit 100 performs general wireless communication between the mobile communication terminal and a mobile communication network. For example, the RF unit 100 performs transmission and reception of sound data through a wireless network, transmission and reception of a character message, and transmission and reception of a multimedia message.

The input unit 200 may be at least one of a general keypad, touch screen, touch pad, and scroll wheel. The input unit 200 outputs a signal corresponding to a user key input to the controller 300 in order to control operation of a mobile communication terminal. In more detail, the input unit 200 includes a key for generating a signal to display data in the standard area 510 of the wide display unit 500 on a full screen, and a key for generating a signal to select a content displayed in the extension area 520 of the wide display unit 500 and to display the content in the standard area 510.

The sensor unit 250 is a rotation detection sensor, such as a gyro sensor or a geomagnetic sensor, for detecting a rotation of the wide display unit 500. The sensor unit 250 outputs, when a rotation of the wide display unit 500 is detected, a detected rotation result to the controller 300.

The controller 300 controls general operations performed in the mobile communication terminal. The controller 300 includes a transmission means for encoding and modulating a signal to be transmitted from the RF unit 100, and a reception means for decoding and demodulating a received signal. The controller preferably 300 further includes a modem and codec.

The controller 300 receives a rotation result of the wide display unit 500 corresponding to a rotation of the wide display unit 500 from the sensor unit 250. The controller 300 calculates a rotation angle of the wide display unit 500 and determines a rotation direction thereof according to the received rotation result. In this case, the wide display unit 500 and the mobile communication terminal can be rotated together or independently.

In more detail, the controller 300 includes the repartition unit 310 for repartitioning an area of the wide display unit 500 into the standard area 510 and the extension area 520 according to the rotation result of the wide display unit 500 received from the sensor unit 250. The repartition unit 310 repartitions the standard area 510 and the extension area 520, and resets a size and position of the standard area 510 and the extension area 520.

The controller 300 adjusts a size of the data displayed in the standard area 510 and the user's additional information displayed in the extension area 520 according to the reset standard area 510 and extension area 520.

The controller 300 includes a rotation unit 320 for rotating the data and user's additional information in a direction opposite to a rotation direction of the wide display unit 500. For example, when the wide display unit 500 rotates 270° clockwise (or 90° counterclockwise), the rotation unit 320 rotates, relative to the wide display unit 500, a screen displayed in the wide display unit 500 by the same angle and in the direction opposite to the rotation direction of the wide display unit 500, and outputs the screen to the controller 300, thereby sustaining the angle of initial orientation of the displayed screen relative to the external. The controller 300 further displays the screen received from the rotation unit 320 in the wide display unit 500.

The screen may be a screen of the data displayed in the standard area 510, the user's additional information displayed in the extension area 520, and data displayed in the wide display unit 500 in a full screen mode. The data includes image data and character data displayed in the standard area 510. The data further includes image data and character data of the user's additional information displayed in the extension area 520.

The controller 300 receives a selection signal from the input unit 200 for displaying in detail, in the standard area 510, a content of the user's additional information displayed in the extension area 520. The controller 300 then displays data corresponding to the content of the selected user's additional information in the standard area 510 of the wide display unit 500. The controller 300 may update and display the user's additional information displayed in the extension area 520 of the wide display unit 500 at a time set by the user.

If the controller 300 receives a signal for displaying the data displayed in the standard area 510 in the entire wide display unit 500 from the input unit 200, the controller 300 displays the data on a full screen of the wide display unit 500.

The storage unit 400 stores information (for example, information of a setting state and menu) related to operation of a program for controlling the mobile communication terminal, by the control of the controller 300. The storage unit 400 further stores a screen ratio of the standard area 510 and extension area 520 for displaying as the standard area 510 and extension area 520 in the wide display unit 500. The storage unit 400 stores an address of a web page for displaying a search window corresponding to the user's additional information to display in the extension area 520 and an address of a web page for receiving a Really Simple Syndication (RSS).

The wide display unit 500 displays an operating state, operation result, and information performed in the mobile communication terminal by the control of the controller 300. The wide display unit 500 can use a display unit such as a Liquid Crystal Display (LCD) and an Organic Light Emitting Diodes (OLED) display. A screen ratio of the wide display unit 500 is m:n, wherein 'n' is greater than or equal to 'm'. The wide display unit 500 includes the standard area 510 for displaying data and the extension area 520 for displaying user's additional information.

A screen ratio of the standard area 510 is m:p, and a screen ratio of the extension area 520 is m:n−p. In an exemplary embodiment of the present invention, a rectangular form of wide display unit 500 is described, however other focus including a square form of wide display unit 500 can be used.

The data displayed in the standard area 510 are various data of operating state, operation result, and information performed in the mobile communication terminal. The user's additional information displayed in the extension area 520 is information of a search window connected to an Internet search web page set by the user and information corresponding to the RSS received from an address of a web page stored in the storage unit 400 by the user in order to receive the RSS.

Figure 2:
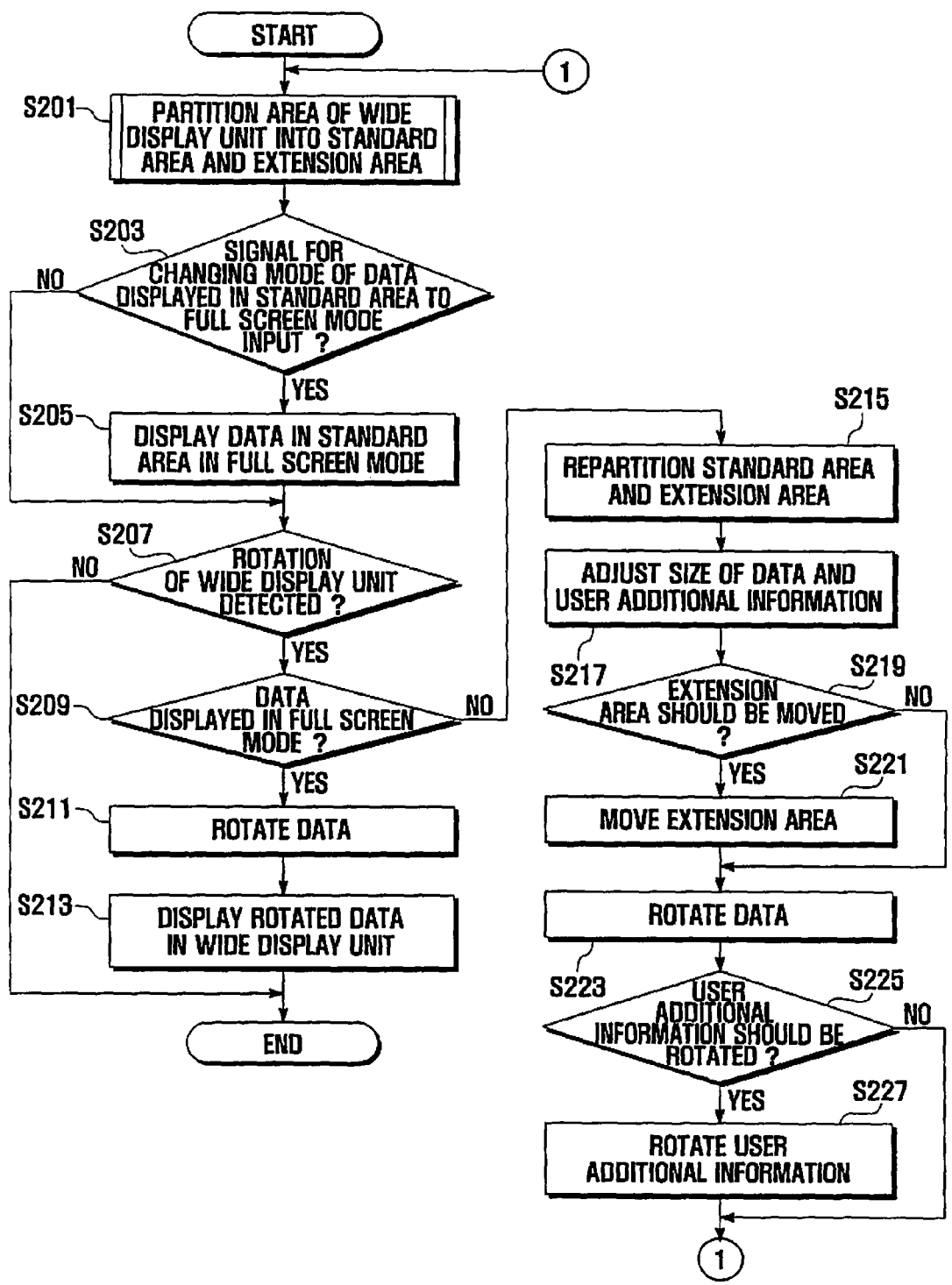
FIG. 2 is a flowchart illustrating a method of controlling a wide display unit in a mobile communication terminal according to an exemplary embodiment of the present invention.
Figure 3:
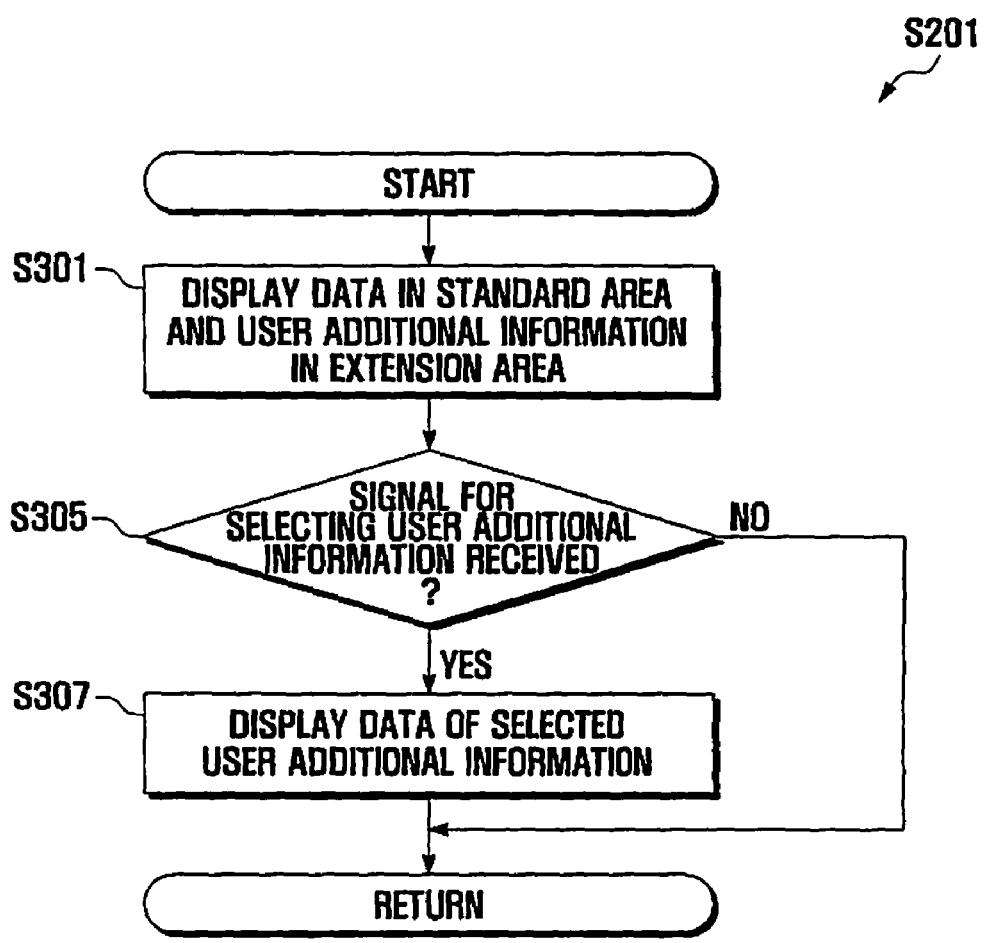
FIG. 3 is a flowchart illustrating a process of displaying a standard area and an extension area of the wide display unit in the method of FIG. 2.

FIG. 2 is a flowchart illustrating a method of controlling a wide display unit in a mobile communication terminal according to an exemplary embodiment of the present invention. FIG. 3 is a flowchart illustrating a process of displaying a standard area and an extension area of the wide display unit in the method of FIG. 2. FIGS. 4A and 4B, and FIGS. 5A and 5B, are examples of display screens illustrating the method of FIG. 2.

Referring to FIGS. 1 to 5, the controller 300 partitions an area of the wide display unit 500 into the standard area 510 and the extension area 520 according to a screen ratio of the wide display unit 500 stored in the storage unit 400 in step S201.

Figure 4A:
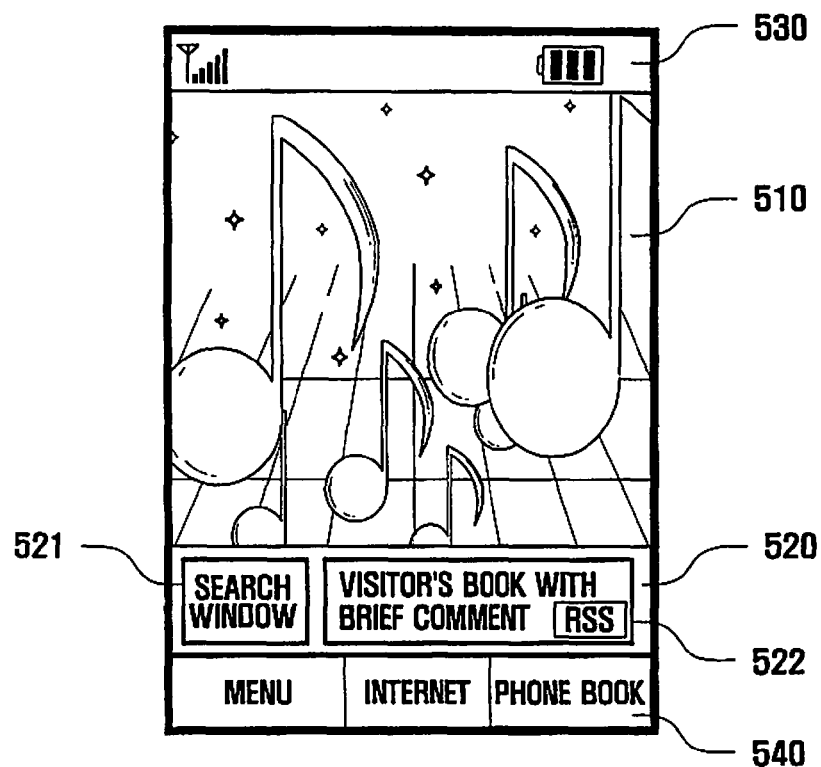
FIGS. 4A and 4B are examples of display screens illustrating the method of FIG. 2.

Step S201 is described in more detail in FIG. 3. The controller 300 displays data in the standard area 510 and user's additional information in the extension area 520 of the wide display unit 500 in step S301, as shown in FIG. 4A.

In this case, a search window 521 in the extension area 520 is connected to an Internet search web page that is set by the user in the user's additional information. An RSS window 522 in the extension area 520 receives update information of information that is set to an Internet search web page by the user in the user's additional information and displays the update information. In the example of FIG. 4A, an RSS displayed in RSS window 522 displays that update information of a mini home page and a brief comment written with up to 30 characters about a movie exists in a visitor's book.

The controller 300 determines whether a signal for selecting the user's additional information is received from the input unit 200 in step S305.

If a signal for selecting the user's additional information is not received from the input unit 200, the process continues in step S203.

If a signal for selecting the user's additional information is received from the input unit 200, the controller 300 displays data of the selected user's additional information in the standard area 510 in step S307. In more detail, when a search word is input to the search window 521, the controller 300 connects to an address of a web page stored in the storage unit 400, searches for the search word, and displays a search result in the standard area 510. Further, when the controller 300 receives a selecting signal of a brief comment written with up to 30 characters about a movie from the input unit 200 on the RSS window 522, the controller 300 connects to a web page stored in the storage unit 400 and displays data about the brief comment written with up to 30 characters about a movie in the standard area 510. In this case, the search window 521 and the RSS window 522 can be changed to other additional information set by the user.

Figure 5A:
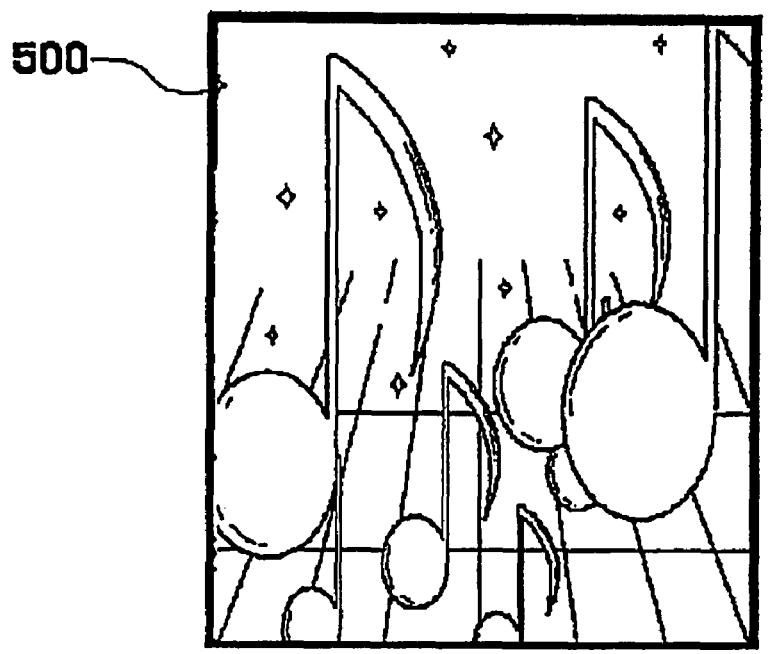
FIGS. 5A and 5B are further examples of display screens illustrating the method of FIG. 2.

Returning to FIG. 2, the controller 300 determines whether a signal for changing a mode of the data displayed in the standard area 510 to a full screen mode is received from the input unit 200 in step S203. If a signal for changing a mode of the data displayed in the standard area 510 to a full screen mode is received from the input unit 200, the controller 300 extends the data displayed in the standard area 510 to an entire size (i.e. a full screen mode) of the wide display unit 500 and displays the extended data in the standard area 510 in step S205. A screen displaying the extended data in the wide display unit 500 is shown in FIG. 5A.

The controller 300 determines whether a rotation of the wide display unit 500 is detected by the sensor unit 250 in step S207. If a rotation of the wide display unit 500 is detected by the sensor unit 250, the controller 300 determines whether data are displayed in a full screen mode in the wide display unit 500 in step S209.

If data are displayed in a full screen mode in the wide display unit 500, the rotation unit 320 rotates the data displayed in the full screen mode by the same rotation angle but in the direction opposite to the rotation direction of the wide display unit 500, and outputs the rotated data to the controller 300 in step S211.

Figure 5B:
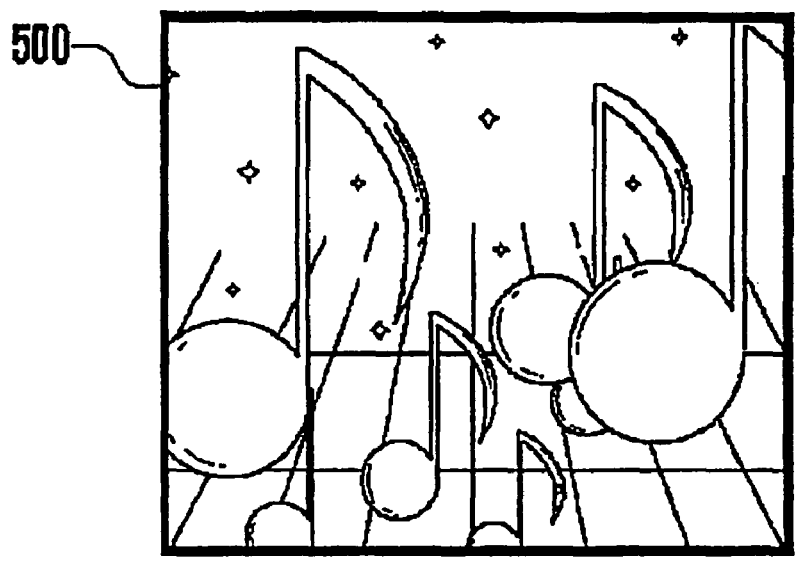

The controller 300 displays the rotated data received from the rotation unit 320 in the wide display unit 500 in step S213, thereby completing the process. A screen displaying the rotated data in the wide display unit 500 is shown in FIG. 5B.

If data are not displayed in a full screen mode in the wide display unit 500 at step S209, the repartition unit 310 repartitions the standard area 510 and the extension area 520, resets a position and size of the repartitioned standard area 510 and extension area 520, and outputs the reset position and size of the standard area 510 and extension area 520 to the controller 300 in step S215. The controller 300 adjusts a size of the data to be identical to the reset size of the standard area 510 having the reset position and size, and adjusts a size of the user's additional information to be identical to the reset size of the extension area 520 having the reset position and size in step S217.

The controller 300 determines whether the extension area 520 should be moved according to the reset position of the extension area 520 in step S219.

If the extension area 520 should be moved according to the reset position of the extension area 520, the controller 300 moves the extension area 520 to the reset position of the extension area 520 in step S221.

The controller 300 rotates the data displayed in the standard area 510 by the same rotation angle but in the direction opposite to the rotation direction of the wide display unit 500 in step S223.

The controller 300 determines whether the user's additional information displayed in the extension area 520 should be rotated in step S225, and if the user's additional information should be rotated, the controller 300 rotates the user's additional information by the same rotation angle but in the direction opposite to the rotation direction of the wide display unit 500 in step S227. The process then returns to step S201, and the controller 300 displays the data and user's additional information in the standard area 510 and the extension area 520, respectively.

Figure 4B:
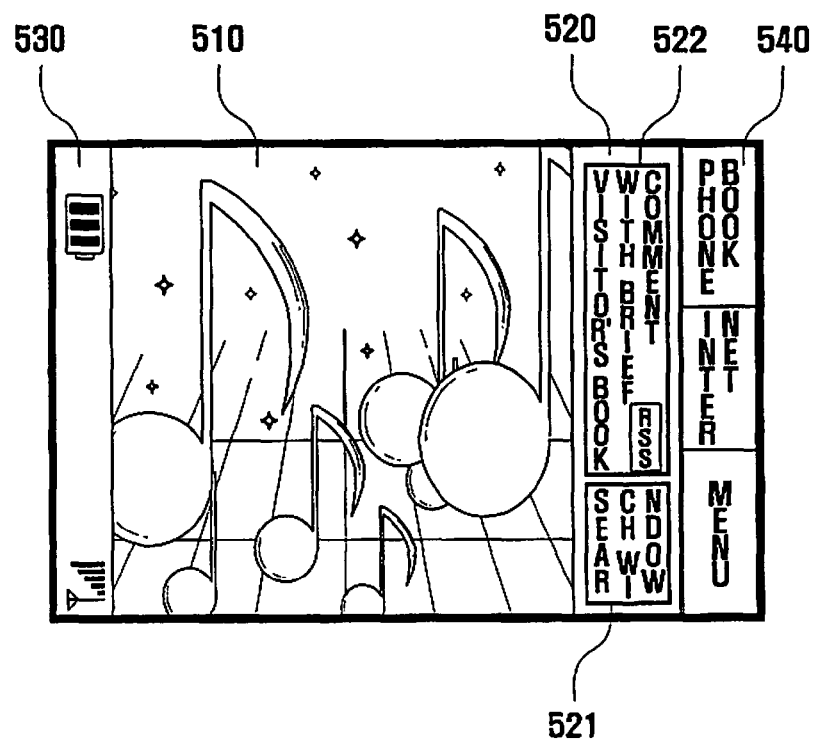

In the example shown in FIG. 4, when the controller 300 receives from the sensor unit 250 information that the wide display unit 500 rotates 270° clockwise (or 90° counterclockwise) from the display screen shown in FIG. 4A to a display screen shown in FIG. 4B, the controller 300 rotates the data of the standard area 510. The data are rotated in a direction opposite to the rotation direction of the wide display unit 500. Also, the user's additional information displayed in the extension area 520, which includes the search window 521 and the RSS window 522, is rotated and displayed in a direction opposite to the rotation direction of the wide display unit 500.

As described above, according to the present invention, by displaying data in a standard area of the wide display unit and displaying user's additional information in an extension area of the wide display unit, the wide display unit can be effectively used.

Further, by displaying the user's additional information in the extension area of the wide display unit, an interface convenient to a user can be provided.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of controlling a wide display unit having a standard area and an extension area in a mobile communication terminal, comprising:
    displaying data in the standard area and user's additional information in the extension area; and
    repartitioning, when a rotation of the wide display unit is detected, the standard area and the extension area, and rotating and displaying the data and the user's additional information in a direction opposite to a rotation direction of the wide display unit.

2. The method of claim 1, wherein rotating and displaying the data and the user's additional information comprises:
    resetting a size and position of the repartitioned standard area and the repartitioned extension area;
    adjusting a size of the data and the user's additional information based on the reset standard area and the reset extension area, respectively;
    rotating the data and the user's additional information in a direction opposite to a rotation direction of the wide display unit; and
    displaying the rotated data and the rotated user's additional information in the reset standard area and the reset extension area, respectively.

3. The method of claim 2, further comprising determining whether the data are displayed in a full screen mode.

4. The method of claim 3, further comprising adjusting, when the data are displayed in a full screen mode, a size of the data, and rotating and displaying the data in a direction opposite to the rotation direction of the wide display unit.

5. The method of claim 4, wherein the wide display unit is rotated by an angle of one of 90°, 180°, and 270°.

6. The method of claim 2, further comprising displaying, when the user's additional information is selected, details of the user's additional information in the standard area.

7. The method of claim 6, further comprising determining whether a change of a mode of the data displayed in the standard area to a full screen mode is selected; and extending, when the change of a mode of the data displayed in the standard area to a full screen mode is selected, the data, and displaying the data in the wide display unit in a full screen mode.

8. The method of claim 7, wherein the user's additional information is at least one of information input to a search window connected to the Internet and updated information received from the Internet.

9. The method of claim 8, wherein the user's additional information is updated according to a preset time and displayed in the extension area.

10. A mobile communication terminal comprising:
a wide display unit having a standard area for displaying data and an extension area for displaying user's additional information;
a sensor unit for detecting a rotation of the wide display unit; and
a controller for controlling the wide display unit to rotate the data displayed in the standard area and the user's additional information displayed in the extension area according to the rotation of the wide display unit detected by the sensor unit.

11. The mobile communication terminal of claim 10, wherein the controller comprises a repartition unit for repartitioning an area of the wide display unit into the standard area and the extension area according to the rotation of the wide display unit detected by the sensor unit.

12. The mobile communication terminal of claim 11, wherein the repartition unit resets a size and position of the standard area and of the extension area.

13. The mobile communication terminal of claim 12, wherein the controller adjusts sizes of the data and the user's additional information according to the reset standard area and the reset extension area, respectively.

14. The mobile communication terminal of claim 13, wherein the controller further comprises a rotation unit for rotating the data and the user's additional information in a direction opposite to a rotation direction of the wide display unit.

15. The mobile communication terminal of claim 14, wherein the user's additional information is at least one of information input to a search window connected to the Internet and updated information is received from the Internet.

16. The mobile communication terminal of claim 14, wherein the data displayed in the standard area are image data and character data, and details of the user's additional information are also displayed in the standard area.

17. The mobile communication terminal of claim 10, wherein the sensor unit comprises one of a gyro sensor and a geomagnetic sensor.

18. A mobile communication terminal comprising:
a display unit for partitioning and displaying data and user's additional information in a plurality of areas;
a sensor unit for detecting a rotation of the display unit;
a repartition unit for repartitioning the areas according to the detected rotation;
a rotation unit for rotating the data and the user's additional information displayed in the areas in a direction opposite to a rotation direction of the display unit; and
a controller for controlling display of the rotated data and the rotated user's additional information in the repartitioned areas.

19. The mobile communication terminal of claim 18, wherein the display unit comprises a wide display unit having a standard area for displaying the data and an extension area for displaying the user's additional information.

20. The mobile communication terminal of claim 18, wherein the sensor unit comprises one of a gyro sensor and a geomagnetic sensor.

* * * * *